United States Patent [19]

Rigby et al.

[11] Patent Number: 4,552,710

[45] Date of Patent: Nov. 12, 1985

[54] PROCESS OF HOT ISOSTATIC PRESSING OF FERRITE MATERIAL

[75] Inventors: Eugene B. Rigby, Tucson, Ariz.; Ralph W. Scheidecker; Robert R. Suchomel, both of Byron, Minn.

[73] Assignee: International Business Machines Corporation, Armonk, N.Y.

[21] Appl. No.: 567,883

[22] Filed: Jan. 3, 1984

[51] Int. Cl.⁴ .................... B29B 1/14; B29C 25/00
[52] U.S. Cl. ........................ 264/64; 264/65; 264/66; 264/570; 264/125; 264/325; 264/332; 425/405 H
[58] Field of Search ............... 264/325, 332, 65, 66, 264/24, 64, 570, 125; 425/405 H

[56] References Cited

U.S. PATENT DOCUMENTS

| | | | |
|---|---|---|---|
| 3,557,266 | 1/1971 | Chiba et al. | 264/66 |
| 3,853,973 | 12/1974 | Hardtl et al. | 264/65 |
| 3,989,438 | 11/1976 | Smith | 264/332 |
| 4,041,123 | 8/1977 | Lange | 264/332 |
| 4,062,922 | 12/1977 | Olson | 264/332 |
| 4,108,652 | 8/1978 | Ogawa | 264/325 |
| 4,112,143 | 9/1978 | Adlerborn | 264/332 |
| 4,209,478 | 6/1980 | Wooten et al. | 264/66 |
| 4,264,546 | 4/1981 | Becker | 264/65 |

Primary Examiner—Jeffery Thurlow
Attorney, Agent, or Firm—Hugh D. Jaeger

[57] ABSTRACT

Process of hot isostatic pressing of MnZn ferrite material for producing ferrite close to theoretical density without a significant increase in grain size. Permeability is increased with the increase in theoretical density. The process includes the steps of pressurizing an entire ferrite sample which is surrounded by pieces of similar composition while in alumina crucibles with fused alumina grain there between and an optional oxygen getter on top of the grain, introducing an inert atmosphere, elevating pressure and temperature, the temperature elevated to a value below that previously used for sintering or hot pressing, and maintaining temperature to optimize density without excess grain growth. Density is thereby optimized without excess grain growth, while maintaining or improving the magnetic properties.

13 Claims, 1 Drawing Figure

4,552,710

PROCESS OF HOT ISOSTATIC PRESSING OF FERRITE MATERIAL

TECHNICAL FIELD

This invention relates to a process for hot isostatic pressing (HIP) of ferrite material for producing ferrite of close to theoretical density without significantly increasing the grain size of the ferrite.

BACKGROUND ART

A prior art patent has been directed to hot isostatic pressing process for manufactured dense articles. U.S. Pat. No. 3,853,973 discloses a method of making highly dense polycrystalline bodies such as video recording heads by treating ferrite in an inert atmosphere under pressure at an elevated temperature. This prior art patent, though, fails to disclose the importance of controlling the chemistry and magnetic properties of the ferrite workpiece undergoing the process.

DISCLOSURE OF THE INVENTION

The present invention provides a process of hot isostatic pressing ferrite material such as MnZn ferrite under conditions of elevated temperature and pressure. This process has been successfully used to HIP ferrite material up to a workpiece thickness of about one inch. This process of the present invention is utilized to increase the ferrite from 92% to 99% plus of theoretical density without a significant increase in material grain size, and providing a superior ferrite which can be processed into desired configurations. This is particularly useful in the production of MnZn ferrite magnetic transducer heads.

According to one embodiment of the present invention, there is provided a process for hot isostatic pressing of ferrite material workpieces having a thickness up to about one inch, previously sintered or hot pressed in a pressurized chamber. The process is comprised of the steps of placing the workpieces in a covered ceramic enclosure surrounded by a finely ground ferrite material having a composition similar to the workpieces, closing the chamber and introducing an inert gas atmosphere within said chamber, elevating the pressure and temperature to 20,000–30,000 pounds per square inch at approximately 1200 degrees centigrade, the temperature to be 25 to 150 degrees centigrade below the previously used sintering temperature. The temperature and pressure are maintained for one to four hours to optimize density to near theoretical without excess grain growth, thereby providing ferrite material of approximating theoretical density at the desired grain size.

One significant aspect and feature of the present invention is a process for hot isostatic pressing of ferrite material providing superior ferrite which can be processed into desired geometrical configurations with significantly less likelihood of chipping as can be a problem with previous fabrication methods. The ferrite is particularly useful in the production of MnZn ferrite magnetic transducer heads. The closely approximated theoretical density of the hot isostatic pressed ferrite provides an increase of as much as thirty percent in the initial permeability at frequencies below about 1 MHz over the prior art.

DESCRIPTION OF THE INVENTION

Figure 1:
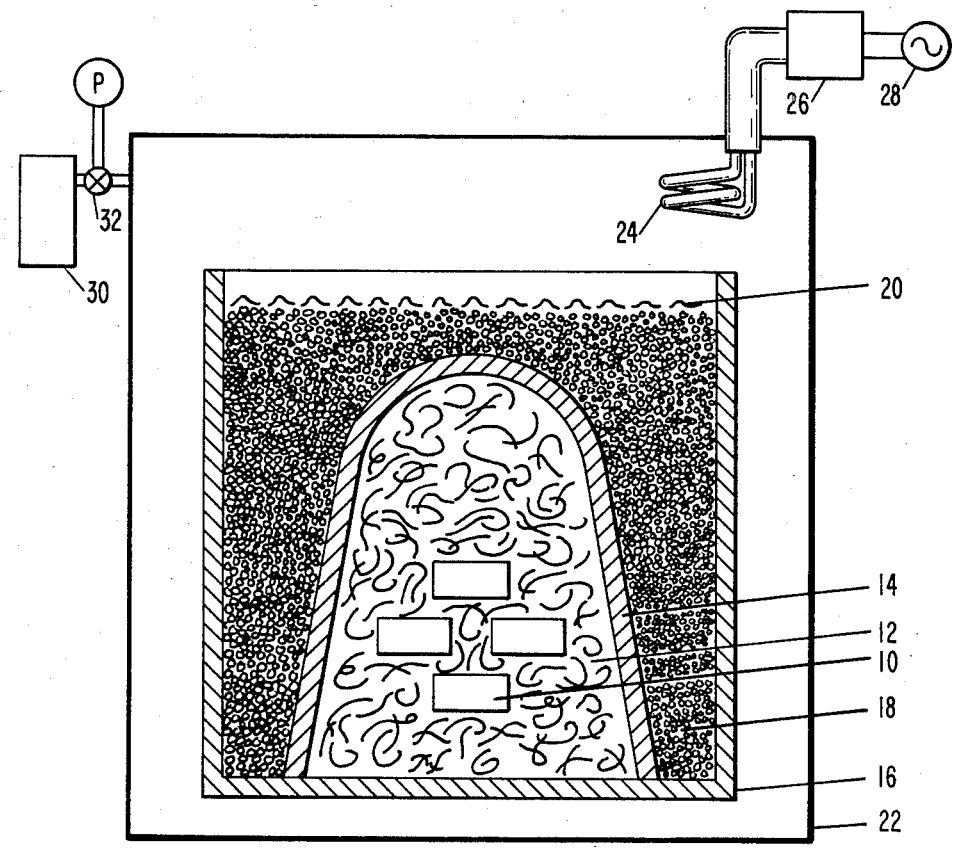
FIG. 1 is a view of the process being carried out by one type of apparatus for hot isostatic pressing of ferrite material.

FIG. 1 illustrates a process for hot isostatic pressing of MnZn or NiZn ferrite material 10 with the apparatus which could be utilized to perform the process. The MnZn ferrite samples 10 are embedded in a matrix of finely ground, correct chemistry MnZn ferrite scrap pieces 12. The scrap pieces are smaller in size than the work pieces in order to provide good chemical protection. Surface area of the scraps is important for good chemical protection. This matrix of ferrite workpieces 10 and ferrite scrap pieces 12, or other ferrite pieces having the same composition as the workpiece, in turn is placed in an impervious ceramic, non-reactive, alumina crucible 14. A second ceramic crucible 16 is inverted over the first alumina crucible 14. A quantity of fused alumina grain 18 of 20 to 40 mesh size fills the space between and about the crucibles 14 and 16, as illustrated in the figures, once the crucibles are inverted. An oxygen getter material such as titanium shavings of fillings 20 can be positioned on top of the fused alumina grain as illustrated in the figure. The alumina grain, titanium getter, and MnZn scrap act together as protective elements against chemical change in the ferrite workpieces. The inert gas also enters the loosely packed ferrite within the crucibles.

The crucible 16 is then placed into a high pressure vessel electric furnace 22 having an electric heater 24 connected to a programmed controller 26 and a source of power 28. An inert gas 30 such as argon or nitrogen passes through a pressure valve 32 for pressurizing the oven 22 to a predetermined pressure.

MODE OF OPERATION

The isostatic pressing of the ferrite materials such as MnZn ferrite which has been previously sintered or hot pressed to greater than 92% of theoretical density occurs within a protective environment in accordance with the process as previously set forth and as now described by way of example, but not construed to be limiting of the present invention.

The chamber of the oven is flushed with inert gas at least three times to remove any air before heat up. The chamber of the oven is sealed and pressurized at room temperature to 9KPSI which increases to achieve a final desired pressure of 30KPSI as the temperature of the oven increases to a soak temperature of 1200 degrees centigrade. Heating rates of up to 10 to 20 degrees centigrade/minute are used to achieve the desired temperature, which is about 25 to 150 degrees centigrade below the previously used sintering or hot pressing temperature. The maximum temperature may be increased if grain growth is desired and at which maximum temperature the pressure should reach 20 to 30KPSI. The temperature is maintained for one to four hours to optimize the density without incurring excess grain growth. After the furnace has cooled at up to 20 degrees centigrade/minute to about 100 degrees centigrade, the pressure is released and the parts can be removed from the pressure chamber. The end result of the process is nearly theoretically dense ferrite with a high permeability and a very small increase in grain size.

Most metal containers do not have the strength nor the required non-reactivity with ferrites at the temperatures under consideration. Platinum crucibles are acceptable, but are too expensive. Alumina crucibles are non-reactive, inexpensive, and readily available. Stabilized zirconia crucibles can also be used but are expensive and not readily available.

The alumina grain, titanium getter and MnZn ferrite scrap all act as protective elements against chemical change in the ferrite work pieces. The chemistry of the ferrite must be maintained during the hipping operation to preserve its magnetic properties. The principle source of degradation is due to volatilization of metal atoms of the ferrite. Zinc is particularly prone to this. The large surface area of the sacrificial scrap ferrite assures that very little of the metal vapor comes from the ferrite workpieces. In addition, the alumina and titanium also protect the molybdenum furnace elements from volatiles liberated by heat from the ferrite. There is a double protection of chemical stability maintained in the ferrite work pieces and preservation of the furnace heating elements.

The oven, furnace elements, and crucibles with the ferrite are all sealed before the initial 9KPSI of argon gas has been introduced into the oven chamber. The furnace heat up causes the inert gas to expand in the chamber producing a pressure of approximately 30KPSI when the temperature has reached 1200 degrees centigrade. The HIP equipment is designed such that it is possible to open a valve for increasing or decreasing the amount of gas in the chamber at any temperature; however, this action is not normally required. The gas is allowed to escape from the furnace chamber after the furnace has cooled to the 200 to 400 degree centigrade range.

Since the two alumina crucibles are not sealed together, but are positioned one on the other, the inert gas can readily penetrate the titanium, alumina, grain, and the points of contact between the two crucibles and enter into the loosely packed ferrite within the crucibles. The only gas tight seal is the overall oven chamber that contains the heating elements, crucibles and their contents.

We claim:

1. Process of hot isostatic pressing of ferrite material workpieces of a predetermined thickness in a sealed oven, said ferrite material workpieces having been previously sintered or hot pressed, comprising of steps of:
   a. placing ferrite material workpieces in a covered ceramic enclosure;
   b. surrounding said ferrite material workpieces by finely ground ferrite pieces of large surface area having a composition substantially similar to said ferrite material workpieces providing good chemical protection;
   c. sealing said oven and introducing an inert gas atmosphere under pressure within said oven;
   d. elevating said pressure and temperature to predetermined levels in said oven below that previously utilized for sintering or hot pressing said ferrite material workpieces for said sintering or hot pressing; and
   e. maintaining said temperature for a predetermine time interval for said ferrite material workpieces in said oven, thereby providing that said ferrite material approaches theoretical density without significant increase in grain size of said ferrite material workpieces.

2. Process of claim 1 wherein said thickness of said workpieces is no greater than 1.0 inch.

3. Process of claim 1 wherein said temperature is substantially 1200 degrees centigrade.

4. Process of claim 1 wherein said temperature is substantially 25 to 150 degrees centigrade below said previously utilized temperature.

5. Process of claim 1 wherein said pressure is 20,000 to 30,000 pounds per square inch.

6. Process of claim 1 wherein said predetermined time interval is one to four hours.

7. Process of claim 1 wherein said inert gas atmosphere is argon or nitrogen.

8. Process of claim 1 further comprising the steps of placing said workpieces in a first alumina crucible ceramic enclosure and inverting a second alumina crucible ceramic enclosure over said first alumina crucible.

9. Process of claim 8 comprising the step of filling space between said first and second crucibles with fused alumina grain.

10. Process of claim 9 wherein said fused alumina grain is 20 to 40 mesh.

11. Process of hot isostatic pressing ferrite material workpieces containing zinc and having a thickness no greater than one inch, said ferrite material workpieces having been previously sintered or hot pressed, comprising the steps of:
   a. placing said ferrite material workpieces in a covered alumina ceramic enclosure within an oven chamber surrounded by ferrite scrap pieces of large surface area having a like ferrite composition providing good chemical protection;
   b. closing said oven chamber and introducing an inert gas atmosphere within said chamber;
   c. elevating pressure and temperature respectively to about 20,000 to 30,000 pounds per square inch and to about 1200 degrees centigrade, said temperature to be 25 to 150 degrees centigrade below the previously used sintering or hot pressing temperature for said ferrite material workpieces; and,
   d. maintaining the temperature for one to four hours providing an increase of ferrite from 92 percent to 99 percent plus of theoretical density with no significant increase in material grain size of said ferrite material workpieces.

12. Process of claim 11 wherein said workpieces contain zinc are selected from the group of MnZn and NiZn ferrites.

13. Process of hot isostatic pressing of ferrite material workpieces of a predetermined thickness in a sealed oven, said ferrite material workpieces having been previously sintered or hot pressed, comprising of steps of:
   a. placing ferrite material workpieces in a first ceramic enclosure;
   b. surrounding said ferrite material workpieces by finely ground ferrite pieces of large surface area having a composition substantially similar to said ferrite material workpieces providing good chemical protection;
   c. inverting a second ceramic enclosure over said first ceramic enclosure;
   d. filling space between said enclosures with a fused grain;
   e. sealing said oven and introducing an inert gas atmosphere under pressure within said oven;
   f. elevating said pressure and temperature to predetermined levels in said oven below that previously utilized for sintering or hot pressing said ferrite material workpieces for said sintering or hot pressing; and, g. maintaining said temperature for a predetermine time interval for said ferrite material workpieces in said oven, thereby providing that said ferrite material approaches theoretical density without significant increase in grain size of said ferrite material workpieces.

* * * * *